(12) United States Patent
Barbee

(10) Patent No.: US 6,347,377 B2
(45) Date of Patent: *Feb. 12, 2002

(54) METHOD AND APPARATUS FOR PROVIDING INTELLIGENT POWER MANAGEMENT

(75) Inventor: Ronald Barbee, Bayou Vista, TX (US)

(73) Assignee: Phoenix Technologies Ltd., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,674

(22) Filed: Nov. 4, 1998

(51) Int. Cl.$^7$ ................................................ G06F 1/32
(52) U.S. Cl. ........................ 713/300; 713/601; 713/501
(58) Field of Search ................................ 713/300–340, 713/501, 601

(56) References Cited

U.S. PATENT DOCUMENTS

| | | | |
|---|---|---|---|
| 5,461,266 A | * 10/1995 | Koreeda et al. | 307/125 |
| 5,493,670 A | * 2/1996 | Douglis et al. | 713/324 |
| 5,504,907 A | * 4/1996 | Stewart et al. | 713/324 |
| 5,517,649 A | * 5/1996 | McLean | 713/323 |
| 5,630,148 A | * 5/1997 | Norris | 713/322 |
| 5,696,953 A | * 12/1997 | Wong et al. | 713/601 |
| 5,812,861 A | * 9/1998 | Ishac et al. | 713/324 |
| 5,822,577 A | * 10/1998 | McDonald et al. | 395/702 |
| 5,826,092 A | * 10/1998 | Flannery | 713/324 |
| 5,923,889 A | * 7/1999 | Kim et al. | 713/323 |
| 5,930,516 A | * 7/1999 | Watts, Jr. et al. | 713/322 |
| 5,954,820 A | * 9/1999 | Hetzler | 713/323 |
| 5,991,827 A | * 11/1999 | Ellenby et al. | 710/8 |
| 5,996,083 A | * 11/1999 | Gupta et al. | 713/322 |

FOREIGN PATENT DOCUMENTS

| | | |
|---|---|---|
| EP | 0 735 248 A2 | 10/1996 |
| EP | 0 750 248 A2 | 12/1996 |

\* cited by examiner

Primary Examiner—Paul R. Myers

(57) ABSTRACT

The present invention is an apparatus and method for providing power management apparatus for a circuit in a processor-based system. The apparatus comprises a memory to store instruction sequences by which the processor-based system is processed and a processor coupled to the memory. The stored instruction sequences cause the processor to: (a) determine a system access time of the circuit; (b) determine if the system access time is less than a first predetermined value, if so, increasing an accessibility period of the circuit, during which the circuit is active. Various embodiments are described.

12 Claims, 10 Drawing Sheets

METHOD AND APPARATUS FOR PROVIDING INTELLIGENT POWER MANAGEMENT

BACKGROUND OF THE INVENTION

1. Field of the Invention

The present invention relates in general to processor-based systems, and more particularly to an apparatus and method for providing intelligent power management in processor-based systems.

2. Description of the Related Art

Power management is implemented in processor-based systems to conserve power or to reduce the power consumption of the system. Power management is typically implemented by powering down one or more circuits in the system upon detection of a period of non-use or inactivity. The period of non-use or inactivity, typically termed the "time-out" period, is generally fixed. The user typically has to enter a setup mode for a particular application and select or enter a time-out value for the application. Selection of the time-out value is also based on the user's perception of system performance versus battery life expectancy, and thus may not be optimized.

Accordingly, there is a need in the technology for an apparatus and method for providing power management for a number of applications in a processor-based system, which facilitates conservation of power in the system, while optimizing system performance.

BRIEF SUMMARY OF THE INVENTION

The present invention is an apparatus and method for providing power management apparatus for a circuit in a processor-based system. The apparatus comprises a memory to store instruction sequences by which the processor-based system is processed and a processor coupled to the memory. The stored instruction sequences cause the processor to: (a) determine a system access time of the circuit; (b) determine if the system access time is less than a first predetermined value, if so, increasing an accessibility period of the circuit, during which the circuit is active. Various embodiments are described.

DETAILED DESCRIPTION OF THE PREFERRED INVENTION

Principles of Operation

Figure 1:
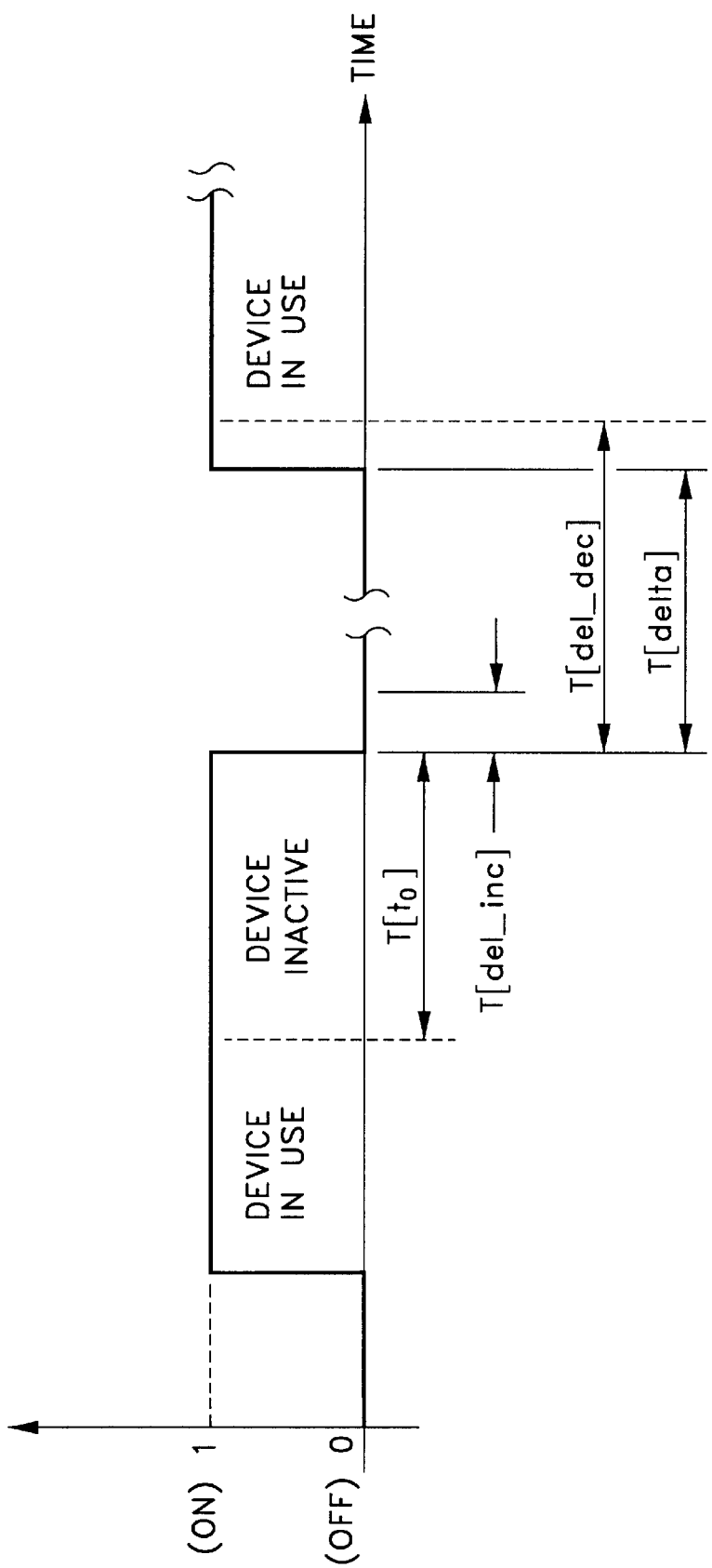
FIG. 1 illustrates one embodiment of a power state profile of a device.

The present invention is an apparatus and method for altering the time period prior to turning off a device based on system-level demands for that device. FIG. 1 illustrates one embodiment of a power state profile of a device. As shown, the device transitions from an in-use period, to an inactive period, an off period and then back to an in-use period.

The following reference designations are used in FIG. 1:

T represents a period of time beginning from the time a device is turned off until it is again accessed;

T[to] represents an inactivity time-out period prior to turning off the device; this value changes as a result of the intelligent power management scheme of the present invention;

T[delta] represents the total time during which a device is turned off, and occurs after the device inactivity period and prior to the time when the device is accessed by the system;

T[delta_inc] represents a stored time interval corresponding to each power-managed device, that is used to determine if the device's time-out period T[to] should be increased. In one embodiment, T[delta_inc] is approximately equal to $\frac{1}{3}\{T[delta]\}$;

T[delta_dec] represents a stored time interval corresponding to each power-managed device, that is used to determine if the device's time-out period T[to] should be decreased. In one embodiment, T[delta_dec] is approximately equal to $T[delta]+\frac{1}{3}\{T[delta]\}$.

Other reference designations that are used in the following sections include the following:

T[ito] represents an initial inactivity time-out value;

DIR represents a flag that indicates the current mode of the "time-out" change;

INDEX represents an integer that is used to control the amount of increase or decrease to the time-out value T[to].

In general, the intelligent power management technique of the present invention determines if the system accesses of a power-managed device are occurring too quickly, too slowly, or if the system accesses are just about right relative to a predetermined time-out inactivity value. The time-out inactivity value corresponds to a predetermined period of time during which a power-managed device is inactive. Upon reaching the end of the time-out inactivity period, the power-managed device is turned off.

If system accesses are occurring faster than a first predetermined time-out value, the device time-out inactivity period T[to] is increased. If system accesses are occurring slower than a second predetermined time-out value, T[to] is decreased. If the accesses are occurring within a range that is acceptable relative to the time-out inactivity value, i.e., T[to] occurs between the first and second predetermined value, no changes are implemented. In one embodiment, T[to] may be increased or decreased at a predetermined rate to accelerate or decelerate the increase or decrease of T[to] by a predetermined number.

In addition, to prevent T[to] from forever increasing without a limit, which would undermine the responsiveness of the system, a boundary condition is set up. A maximum limit T[to_max], where T[to_max]=K*T[to_max], is imposed to ensure that T[to] would not be subject to increasing without limitation. In one embodiment, K=16. In alternate embodiments, K may be any user selected number.

Implementation

Figure 2:
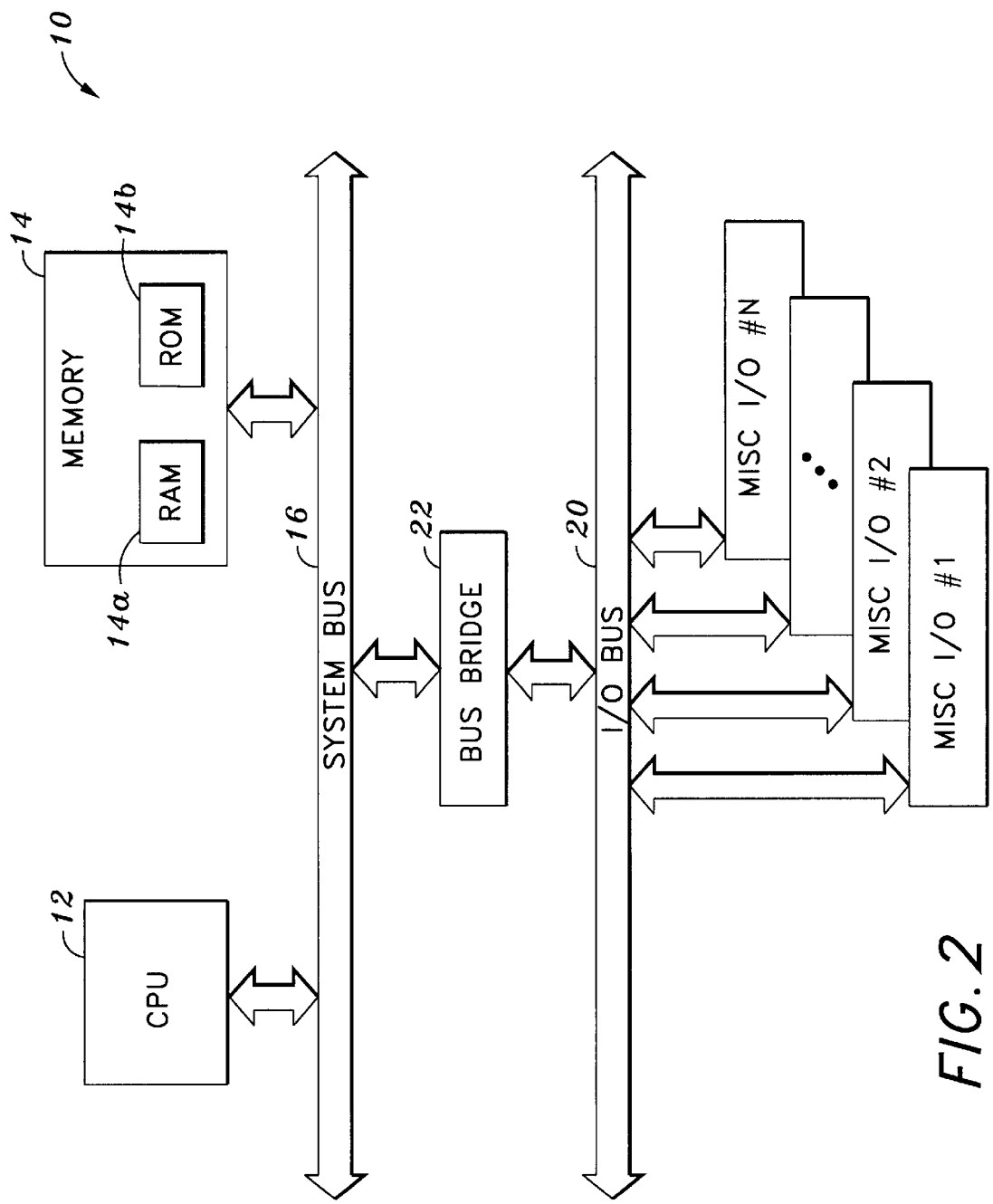
FIG. 2 is a system block diagram of an exemplary processor system in which the apparatus and method of the present invention is used.

The present embodiment is described in reference to a processor system 10. FIG. 2 illustrates an exemplary processor system 10 which implements the processes of the present invention. The processor system 10 comprises a CPU 12 and a memory module 14. The memory module 14 includes random access memory (RAM) 14a and read-only memory (ROM) 14b. In one embodiment, the memory module 14 also includes a main memory or a dynamic random access memory (DRAM). The CPU 12 and memory module 14 are coupled to a system bus 16. The processor system 10 may also include various I/O and peripheral modules (MISC I/O #1, #2, . . . #N) which are coupled along an I/O bus 20 that is in turn coupled to the system bus 20 via a bus bridge 22. Examples of the peripheral modules inclucde a console, a printer and a mouse.

Figure 3:
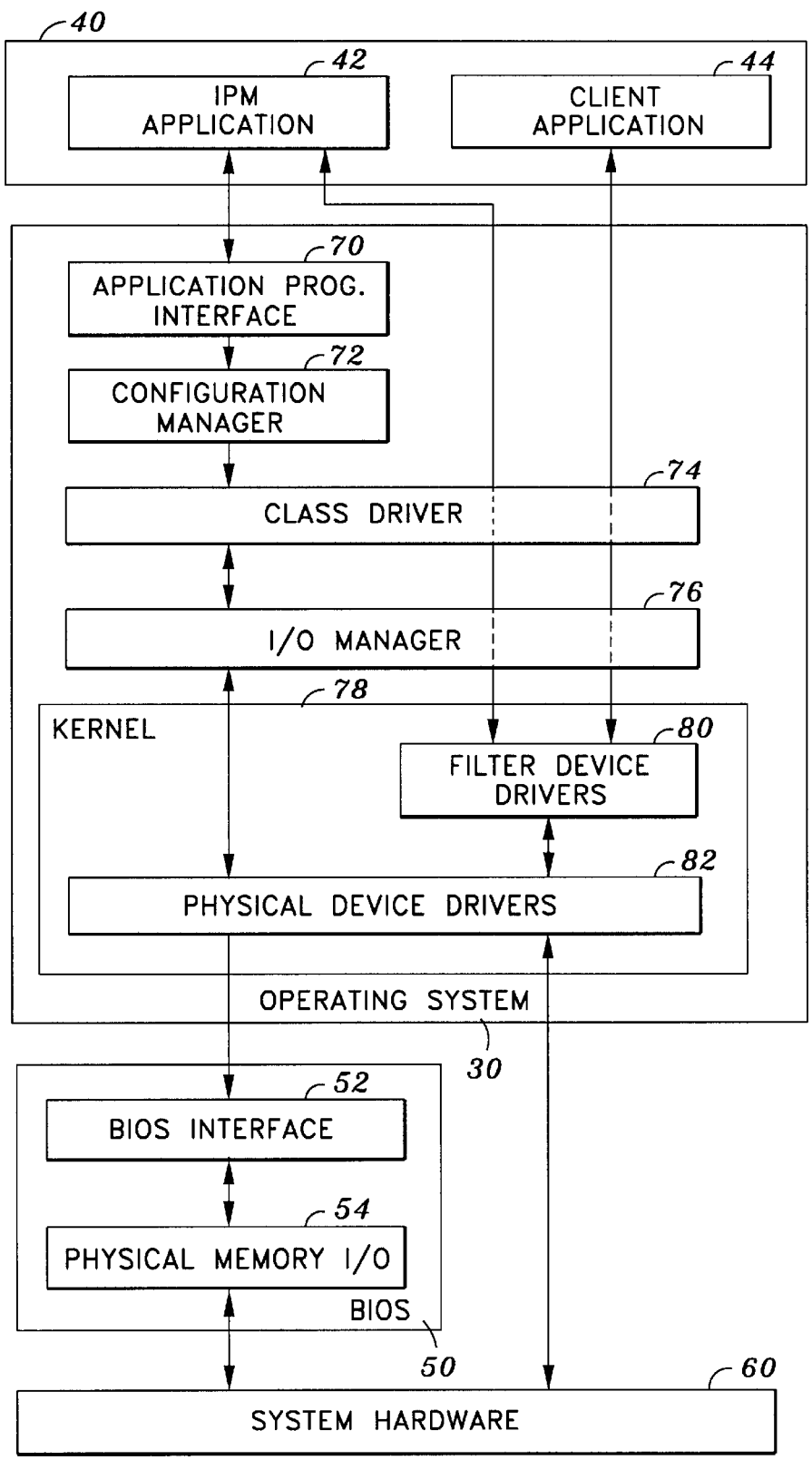
FIG. 3 is an overall functional block diagram illustrating the architecture of an operating system which utilizes the apparatus and method of the present invention.

The present invention is also described with reference to an operating system installed on the processing system 10. FIG. 3 is an overall functional block diagram illustrating the architecture of a processing system 10 that utilizes the apparatus and method of the present invention. The processing system 10 comprises an operating system 30 which supports user applications 40, Basic Input/Output System ("BIOS") 50 and system hardware 60. The user applications 40 include an intelligent power management (IPM) application 42 and client application(s) 44. The BIOS 50 is a collection of drivers, or software interfaces for hardware devices such as the console (keyboard and display), a generic printer, the auxiliary device (serial port), the computer's clock and the boot disk device. The BIOS 50 is typically embedded in programmable, read only memory (PROM). Art operating system typically makes no use of the BIOS 50 after the operating system has been booted and is running. The kernel level drivers in the operating system 30 may interface directly with the system hardware 60.

The operating system 30 includes an Application Program Interface (API) 70 which interfaces with the IPM Application 42, and a Configuration Manager 74 which allocates resources installed on the operating system 30 based on requests from the IPM Application 42. The operating system 30 further includes a class driver 74 which interfaces with the user applications 40 (either directly, as in the case of the client applications 44, or via the API 70 and Configuration Manager 72), and an I/O Manager 76. The I/O Manager 76 converts I/O requests (made via the class driver 74) into properly sequenced calls to various driver routines located in the kernel 78. In particular, when the I/O Manager 76 receives an I/O request, it uses the function codes of the request to call one of several dispatch routines in a driver located in the kernel 78. The kernel 78 provides hardware-independent functions, called system functions, that are accessed by means of a software interrupt. The functions provided by the kernel 78 include file and directory management, memory management, character device input/output and time and date support, among others. In one embodiment, the operating system is the Windows NT operating system. In alternate embodiments, the operating system 30 includes the Solaris or the AIX operating systems or other operating systems based on demand-paged virtual memory subsystems.

The present invention provides the IPM Application 42 which monitors the I/O activities of I/O devices such as MISC I/O #1, . . . , MISC I/O #N (FIG. 2) through the use of one or more Filter Device drivers 80, located within the kernel 78. Based on information provided by the filter device drivers 80, the IPM Application 42 identifies the most suitable power state for power-managed devices installed on the system 10 and/or for the system 10 using the knowledge-based technique of the present invention. The power state of the system hardware 60 can then be efficiently controlled and managed. In one embodiment, the IPM Application 42 controls the power state of system hardware through the use of the Configuration Manager 72, which provides the necessary pointers to the physical device drivers 82 located within the kernel 78. The physical device drivers 82 can either directly control system hardware 60 or interface with the system hardware 60 through the BIOS interface 52 and Physical Memory and I/O circuit 54 of BIOS 50.

In one preferred embodiment, the IPM Application 42 and the Filter Device Drivers 80 comprise source code written in the C language. It is understood that other assembly languages may be utilized in implementing the functions of the IPM Application 42 and Filter Device drivers 80. The BIOS data and addresses are typically located in physical memory 50 (typically in RAM 14a; see FIG. 1) and are accessed by the physical device drivers 82.

Figure 4:
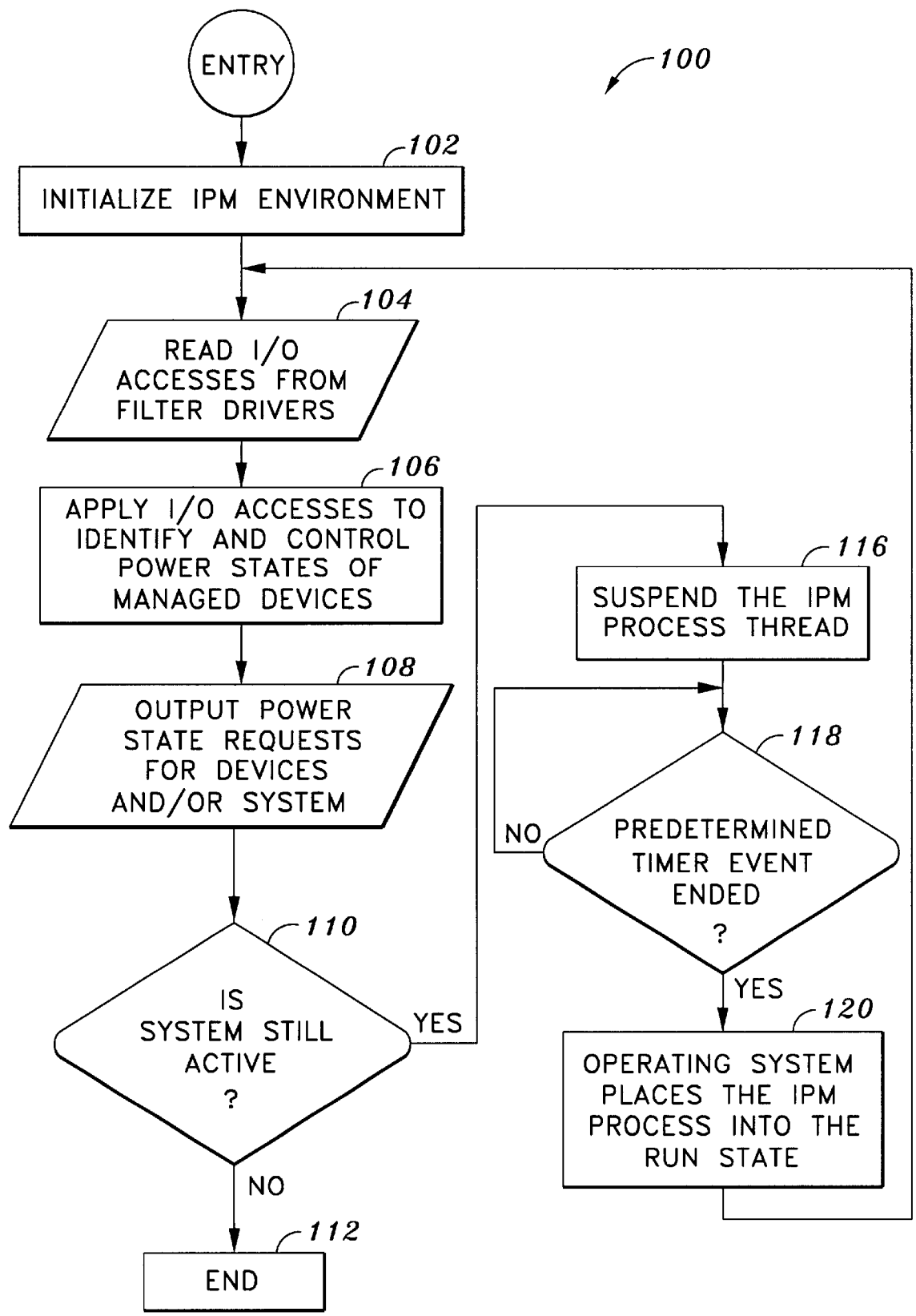
FIG. 4 is a top-level flow chart of one embodiment of a general process that implements the Intelligent Power Management (IPM) technique of the present invention.

FIG. 4 is a top-level flow chart of one embodiment of a general process that implements the IPM technique of the present invention. In one embodiment, after initialization of the IPM environment, the system process is configured to run at a predetermined interval, e.g., every 10 seconds. This interval was established as a trade-off between the granularity of monitoring and controlling power-managed devices and the minimization of the IPM process's consumption of power. The predetermined interval may be increased or decreased depending on system requirements and user preference.

The system process 100 of the present invention which implements the IPM process (generally represented by process blocks 106–108) proceeds from a start state to process block 102, where the IPM environment is initialized. In particular, various circuits such as timers or variables required for the use of the system process 100 are initialized. The process 100 then advances to process block 104, where I/O accesses from the Filter Device Drivers 80 (see FIG. 3) are read. The I/O accesses are then applied by the process 100 to identify and control the power states of one or more power-managed device(s), as shown in process block 106. The process 100 subsequently outputs one or more power state requests for controlling the power-managed device(s) and/or the system 10, as shown in process block 108. In one embodiment, such requests are serviced by the Configuration Manager 72 (FIG. 3).

The process 100 then proceeds to decision block 110, where it determines if the system is still active. If not, the process 100 is terminated (process block 112). Otherwise, the IPM process 100 is suspended for a predetermined period of time. In one embodiment, the IPM process 100 is suspended for 10 seconds. In particular, a timer is set to a predetermined period of time. The process 100 determines if the predetermined period has lapsed, as shown in decision block 118. If not, the process 100 continues to monitor the timer event. Otherwise, it proceeds to process block 120, where the operating system places the IPM process into the run state and returns to process block 104.

Figure 5A:
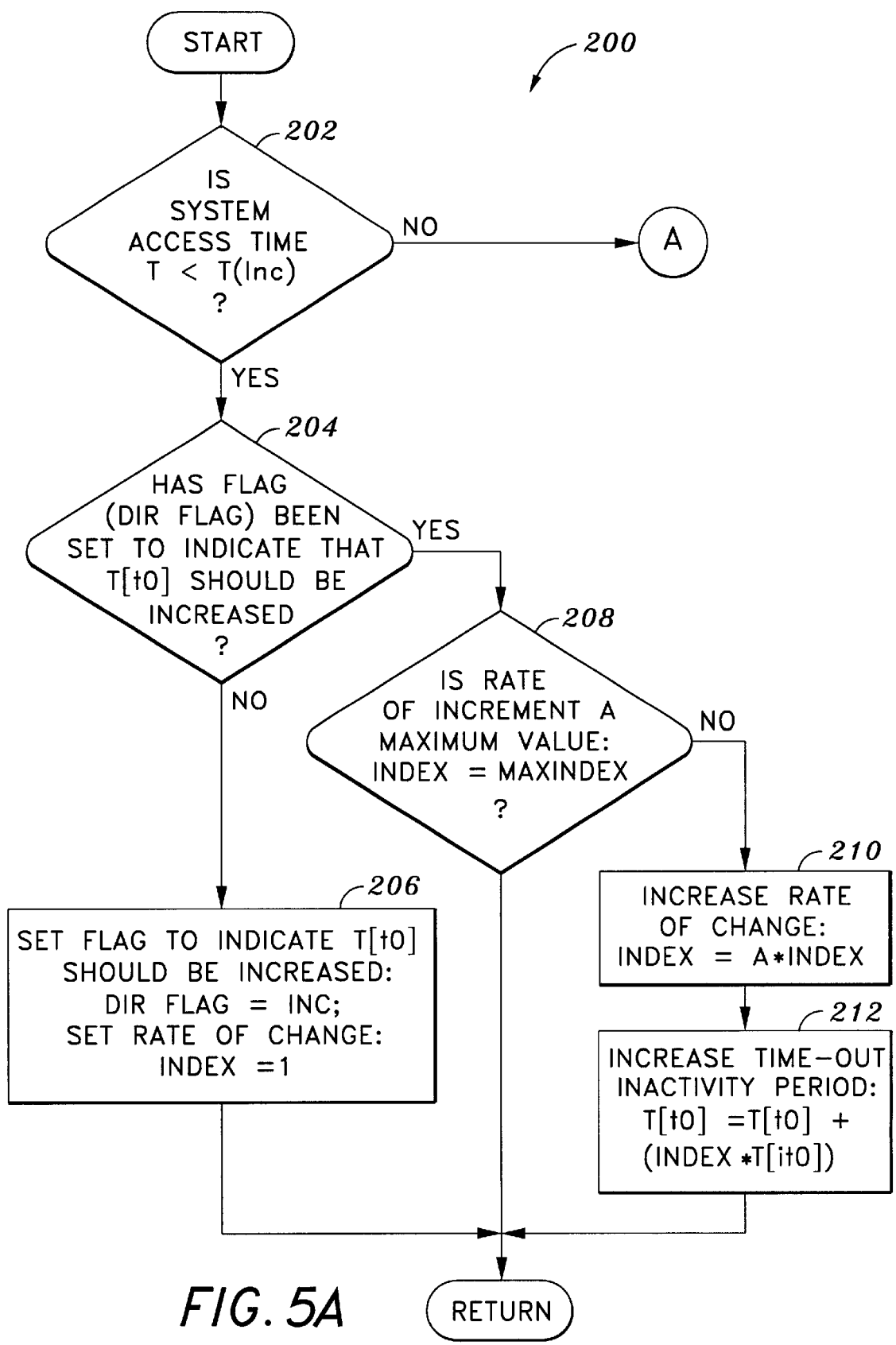
FIG. 5 is a flow chart that illustrates one embodiment of the IPM process of the present invention.
Figure 5B:
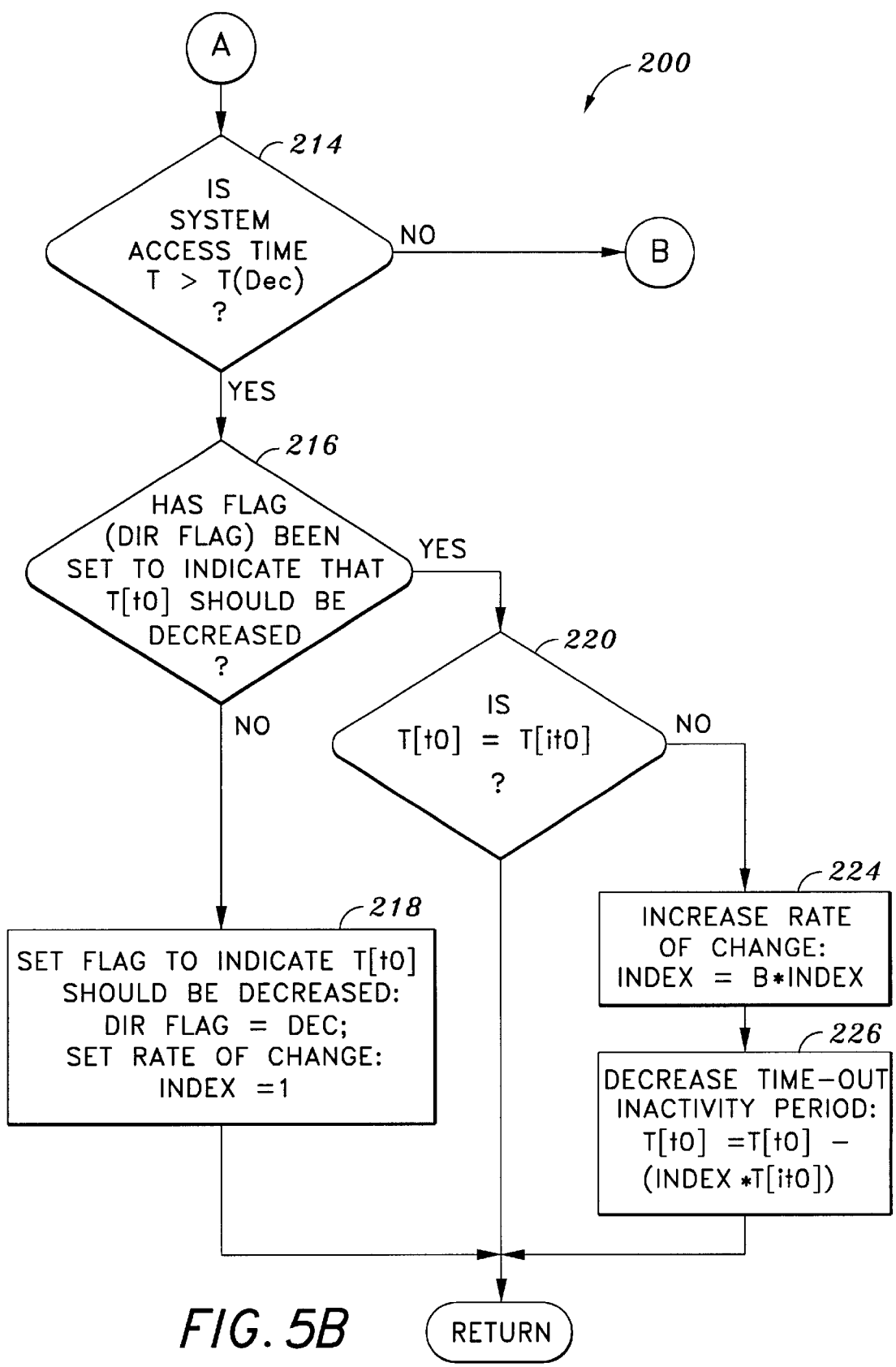
Figure 5C:
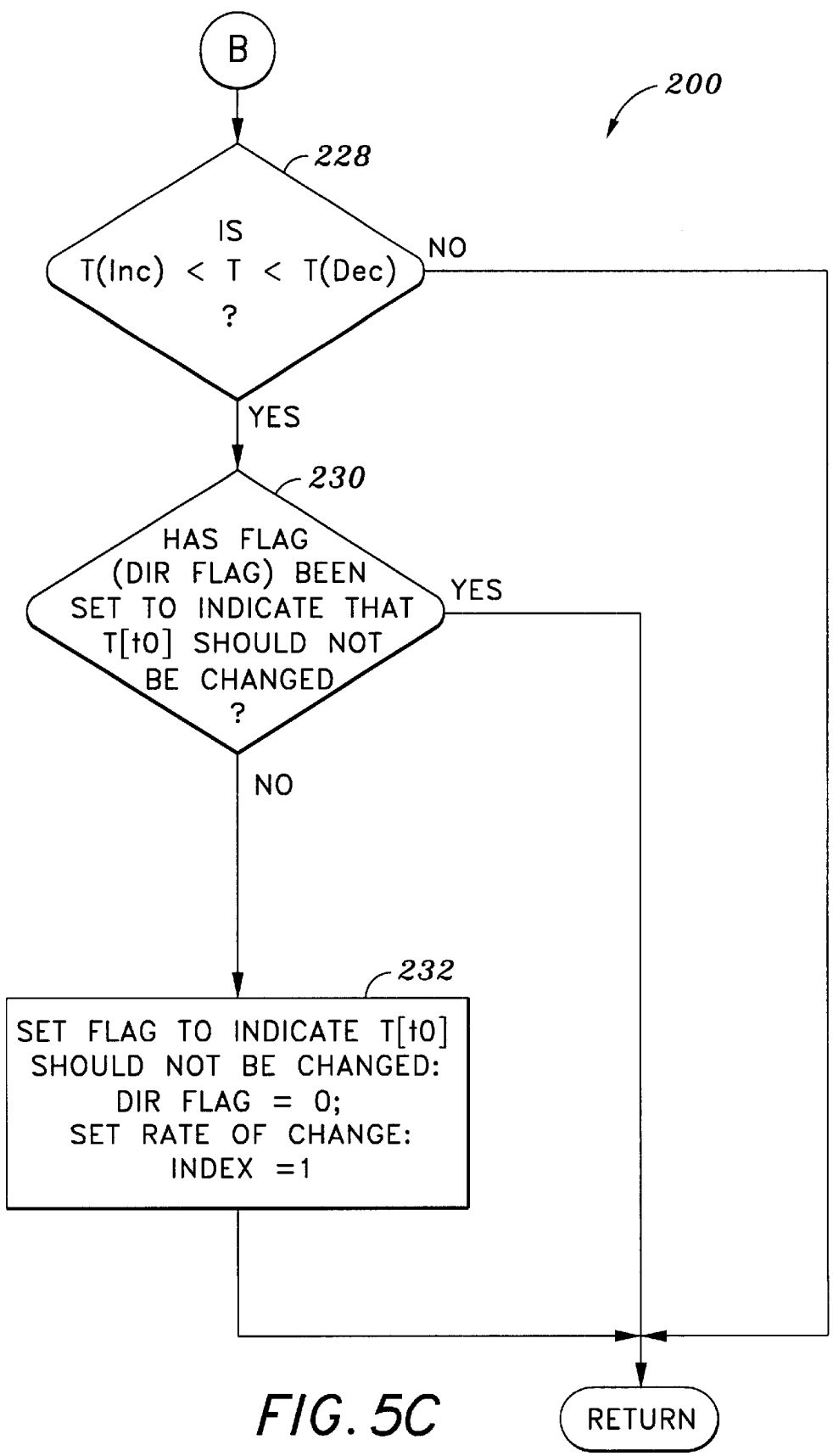

FIG. 5 is a flow chart that illustrates one embodiment of the IPM process of the present invention. In one embodiment, the IPM process of FIG. 5 may be implemented for device management of I/O devices such as hard disk drives, CD ROMs, and Modems. The IPM process 200 begins from a start state and proceeds to process block 202, where it determines if T, the system access time of a managed device, is less than a first predetermined value, T(Inc). If so, the process 200 proceeds to decision block 204, where it determines if the flag, DIR FLAG, which indicates the current mode of the time-out inactivity change, has been set to indicate that T[to] should be increased. If not, the process proceeds to process block 206, where the DIR FLAG is set to INC, indicating that T[to], the time-out inactivity period for the managed device, should be increased. In addition, INDEX, the rate of change of T[to], is set to 1. The process 200 then terminates.

If, at process block 204, the process 200 determines that the flag, DIR FLAG, which indicates the current mode of the time-out inactivity change, has been set to indicate that T[to] should be increased, the process proceeds to decision block 208, where it determines if the rate of increasing T[to] is a maximum value. If so, the process 200 returns to the system process 100 flow. Otherwise, the process proceeds to process block 210, where it increases INDEX, the rate of changing T[to] by setting INDEX=A*INDEX, where A is a predetermined number. In one embodiment, A=2. The process then proceeds to process block 212, where the time-out inactivity period T[to] is increased by setting INDEX=INDEX*T[ito], where T[ito] is the initial time out inactivity value. The process 200 then returns to the main process 100 flow.

If, at decision block 202, the process determines that the system access time T is not less than the first predetermined value, T(Inc), the process 200 proceeds to process block 214, where it determines if the system access time is greater than a second predetermined period, T(Dec). If so, the process proceeds to decision block 216, where it determines if the DIR FLAG has been set to indicate that T[to] should be decreased. If not, the process proceeds to process block 218, where it sets the DIR FLAG to indicate that T[to] should be decreased. In one embodiment, DIR FLAG is set to a value of "2", indicating that T[to] should be decreased. The process 200 then returns to the main process 100 flow. If, at decision block 216, the process determines that the DIR FLAG has been set to indicate that T[to] should be decreased, it proceeds to decision block 220, where it queries if T[to] is equal to T[ito], the initial time-out inactivity value. If so, the process 200 returns to the main process 100 flow. Otherwise, it proceeds to process block 224, where it increases the rate of change, INDEX by setting INDEX=B*INDEX, where B is a constant. In one embodiment, B=2. The process 200 then proceeds to process block 226, where it decreases the time out inactivity period T[to] by setting T[to]=T[to]−(INDEX*T[ito]). The process 200 then returns to the main process 100 flow.

If, at decision block 214, the process 200 determines that T is not greater than a second predetermined value, T(Dec), the process 200 proceeds to decision block 228, where it queries if T is within an acceptable range. In one embodiment, the process queries if T(Inc)<T<T(Dec). If so, the process proceeds to process block 230, where it determines if the DIR FLAG has been set to indicate that T[to] should not be changed. If not, the process 200 proceeds to process block 232, where it sets the DIR FLAG to indicate that T[to] should not be changed. In one embodiment, DIR FLAG is set to a value of "0", indicating that T[to] should not be changed. The process 200 then returns to the main process 100 flow. If, at decision block 230, the process 200 determines that the DIR FLAG has been set to indicate that T[to] should be decreased, it returns to the main process 100 flow. In addition, if at decision block 28, the process determines that T is not within the predetermined acceptable range, i.e., T is not greater than T(Inc) and not less than T(Dec), the process returns to the main process 100 flow.

Figure 6:
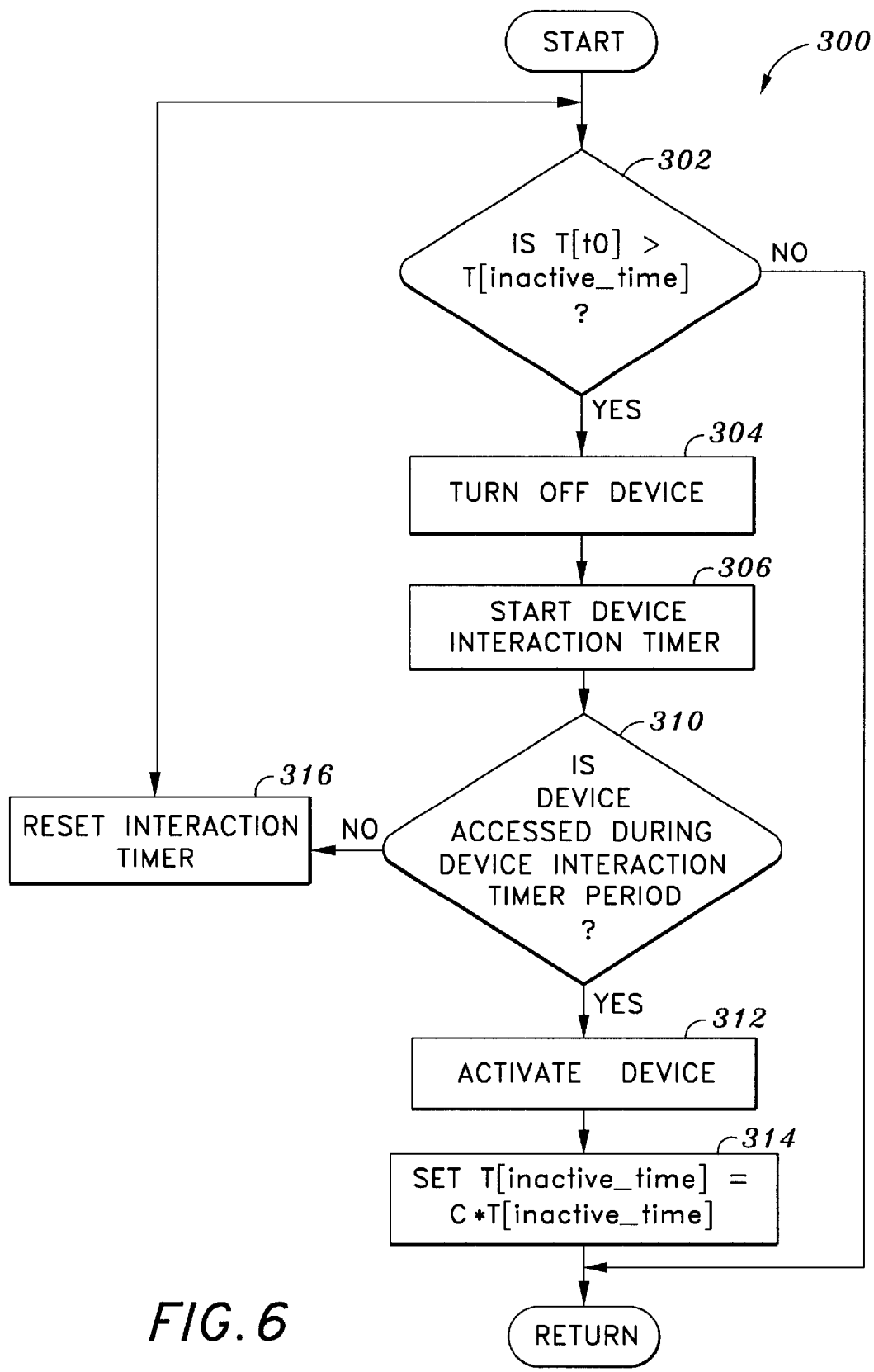
FIG. 6 is a flow chart that illustrates a second embodiment of the IPM process of the present invention.

FIG. 6 is a flow chart that illustrates a second embodiment of the IPM process of the present invention. In one embodiment, the IPM process 300 may be implemented for the management of display devices such as video circuits. The IPM process 300 begins from a start state and proceeds to decision block 302, where the process 300 determines if T[to], the time out inactivity period of a device is greater than T[inactive_time] a predetermined inactivity period. In one embodiment, T[inactive_time] is the inactivity period of an I/O device such as a, keyboard or a pointing device such as a mouse. In another embodiment, T[inactive time] is 10 seconds. If so, the process 300 proceeds to process block 304, where it turns off the device. The process 300 then proceeds to process block, 306, where it starts a device interaction timer, which runs for a predetermined period of time, such as 15 seconds. The process 300 then queries if the managed device was accessed during the device interaction timer period, as shown in decision block 310. If so, the process 300 proceeds to process block 312, where it activates the managed device. The process 300 also proceeds to set T[inactive_time]=C*T[inactive_time], where C is a predetermined number. In one embodiment, C=4. The process 300 then returns to the main process 100 flow. If, at decision block 310, the process determines that the device was not accessed during the device interaction timer period, the process 300 advances to process block 316, where the interaction timer is reset. The process then returns to decision block 302. If at decision block 302, the process 300 determines that T[to] is not greater than T[inactive_time], the process 300 returns to the main process 100 flow.

Figure 7:
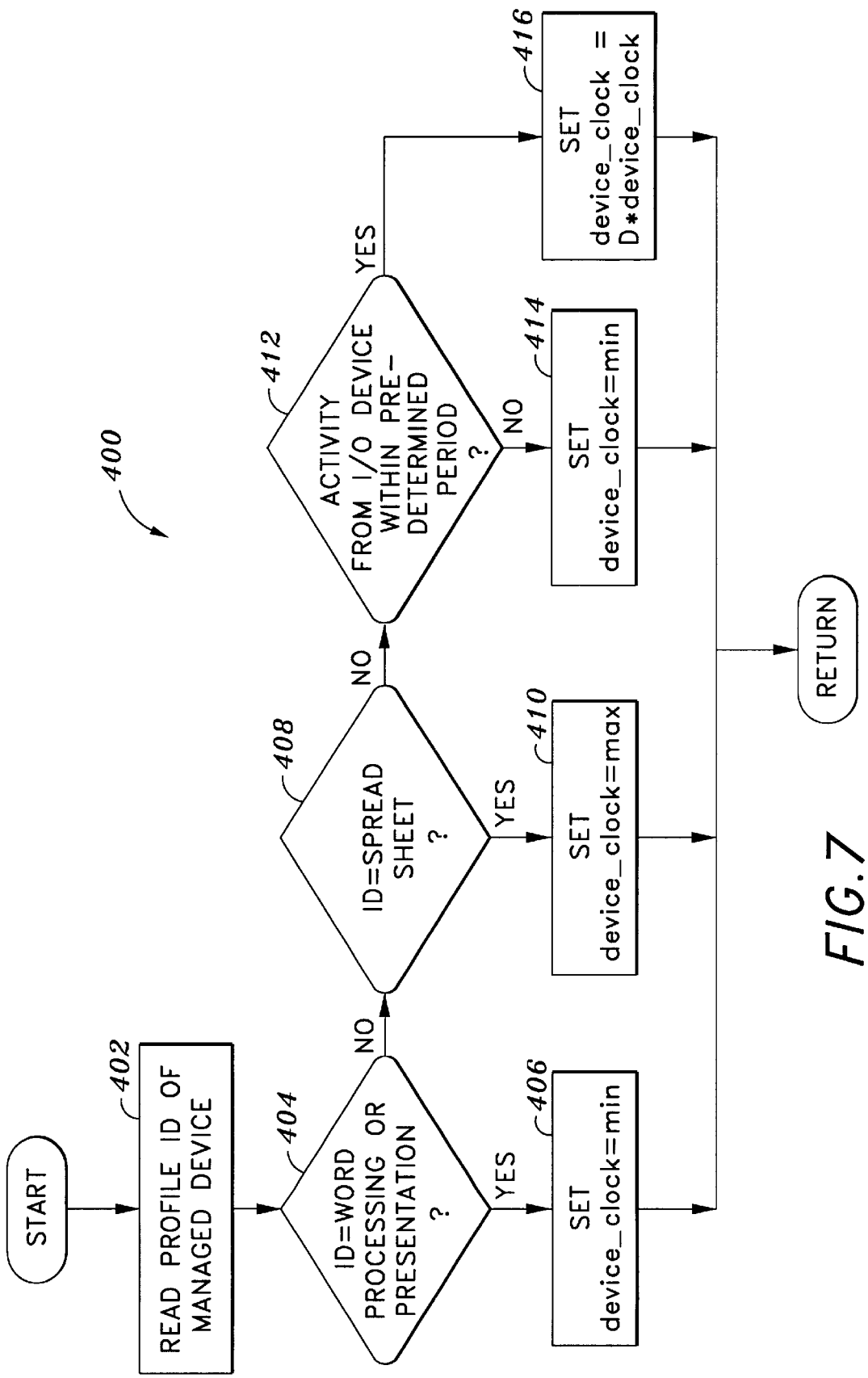
FIG. 7 is a flow chart that illustrates a third embodiment of the IPM process of the present invention.

FIG. 7 is a flow chart that illustrates a third embodiment of the IPM process of the present invention. In one embodiment, the IPM process 400 may be implemented for the management of processing circuits such as processing units or CPUs. Beginning from a start state, the process 400 proceeds to process block 402, where it reads the profile identification (ID) of the managed device. The profile ID provides the operational mode of the managed device. The process 400 then proceeds to decision block 404, where it queries if the profile ID of the device indicates that the device is providing word processing or presentation services. If so, the process sets the device clock to min, which is a fraction of the full operational speed of the managed device. In one example, "min"=25% of the full operational speed of the managed device. The process 400 then returns to the main process 100 flow.

If, at decision block 404, the process determines that the profile ID of the managed device is neither word processing nor presentation services, it proceeds to decision block 408, where it determines if the profile ID of the device indicates that it is involved in providing spreadsheet services. If so, the process 400 sets the device clock to max, as shown in process block 41, which is a predetermined percentage of the full operational speed of the managed device. In one embodiment, "max" is 100% of the full operational speed of the managed device. The process 400 then returns to the main process 100 flow.

If, at decision block 408, the process 400 determines that the profile ID does not indicate that the device is providing spreadsheet services, it proceeds to decision block 412, where it determines if there is any activity from an I/O device such as, a keyboard, a mouse or a disk drive, within a predetermined period. In one embodiment, the predetermined period is 1 minute. If not, the process 400 proceeds to process block 414, where it sets the device clock to min. The process turn returns to the main process flow. If, at decision block 412, the process 400 determines that there is activity from an I/O device within the predetermined period, the process 400 proceeds to process block 416, where it sets the device clock to device_clock=D* device_clock, where D is a predetermined number. The process 400 then returns to the main process 100 flow.

Figure 8:
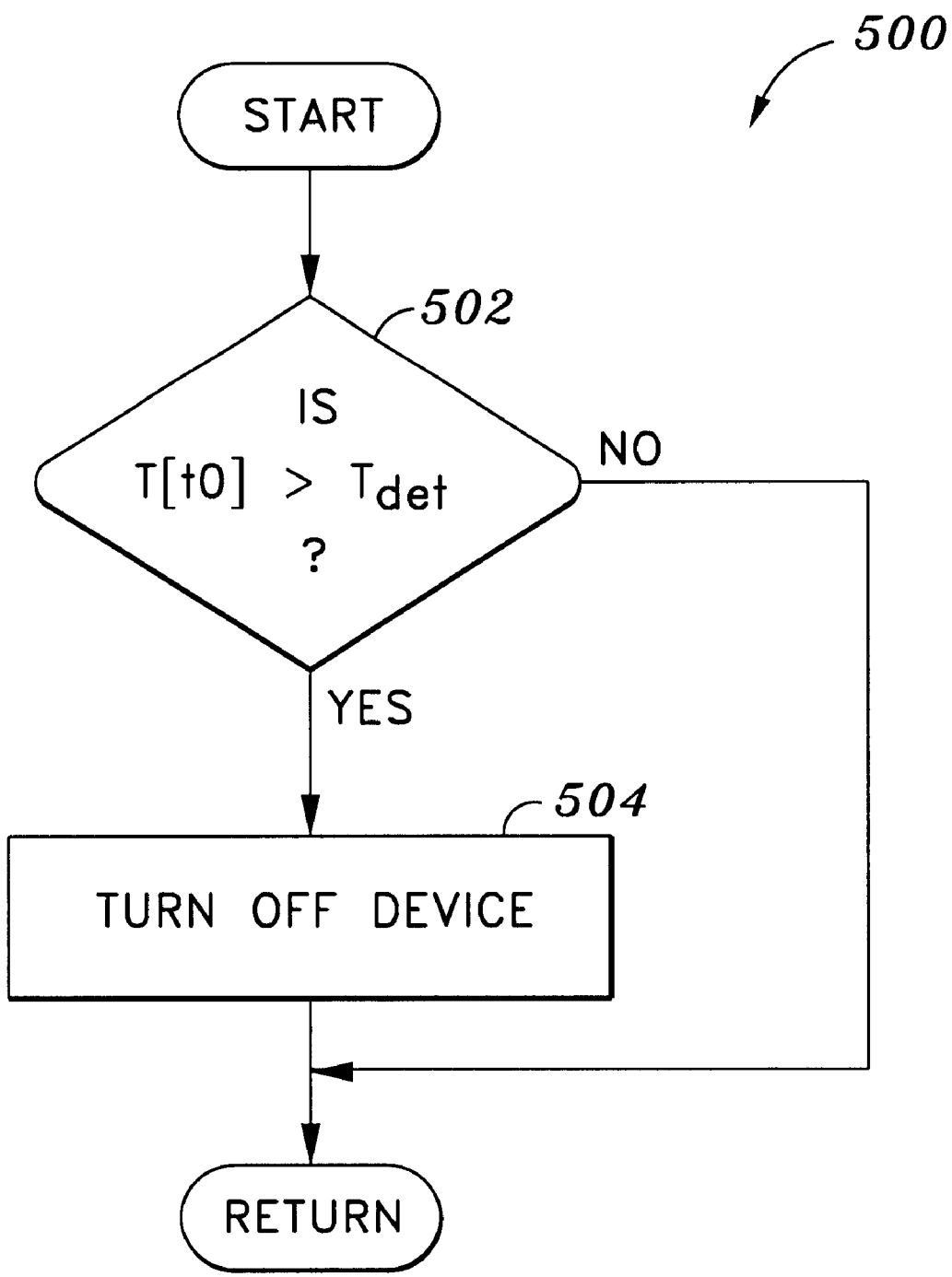
FIG. 8 is a flow chart that illustrates a fourth embodiment of the IPM process of the present invention.

FIG. 8 is a flow chart that illustrates a fourth embodiment of the IPM process of the present invention. In one embodiment, the IPM process 500 may be implemented for the management of I/O devices such as floppy disks. Beginning from a start state, the process 500 proceeds to process block 502, where it determines if T[to] is greater than a predetermined amount, such as 4 seconds. If so, the device is turned off. The process 500 then returns to the main process 100 flow. If T[to] is less than the predetermined amount, the process 500 directly returns to the main process 100 flow.

The present invention provides an apparatus and method for providing power management for a number of applications in a processor-based system, which facilitates conservation of power in the system, while optimizing system performance.

Although the present invention has been described in terms of certain preferred embodiments, other embodiments apparent to those of ordinary skill in the art are also within the scope of this invention. For example, the processes 100, 200, 300, 400 and 500 described above are illustrative and not restrictive. In addition, the IPM processes 200, 300, 400 and 500 may be implemented separately or in combination. Accordingly, the scope of the invention is intended to be defined only by the claims which follow.

What is claimed is:

1. A power management apparatus for a plurality of devices in a processor-based system, comprising:

a memory to store instruction sequences by which the processor-based system is processed; and a processor coupled to the memory, wherein the stored instruction sequences cause the processor to, for each of the plurality of devices: (a) determine a system access time of a respective device; (b) determine if the system access time of the respective device is less than a first predetermined value, if so, increasing an inactivity period of the respective device, said inactivity period indicating a time period during which the respective device is inactive before deactivating the respective device, (c) determine if the system access time of the respective device is greater than a second predetermined value, if so, decreasing the inactivity period of the respective device; and (d) determine if the system access time of the respective device is within a range between the first and the second predetermined value, if so, preventing the inactivity period of the circuit from changing.

2. The apparatus of claim 1, wherein (a) comprises:

(a.1) monitoring the respective device to determine the system access time of the respective device; and (a.2) providing the system access time of the respective device to the processor.

3. The apparatus of claim 1, wherein (b) comprises:

(b.1) determining if the system access time of the respective device is less than a first predetermined value; and (b.2) if so, increasing the inactivity period of the respective device at a predetermined rate.

4. The apparatus of claim 1, wherein (c) comprises:

(c.1) determining if the system access time of the respective device is greater than a second predetermined value; and (c.2) if so, decreasing the inactivity period of the circuit at a predetermined rate.

5. A method for separately providing power management for a plurality of devices in a processor-based system, comprising:

for each device, determining a system access time of a respective device;

determining if the system access time is less than a first predetermined value, if so, increasing an inactivity period of the respective device where the inactivity period specifies a period of time during which the respective device is inactive before terminating power to the respective device;

determining if the system access time is greater than a second predetermined value, if so, decreasing the inactivity period of the respective device; and determining if the system access time is within a range between the first and the second predetermined values, if so, preventing the inactivity period of the respective device from changing.

6. The method of claim 5, wherein determining the system access time comprises:

monitoring the respective device to determine the system access time of the respective device; and providing the system access time of the respective device to the processor.

7. The method of claim 5, wherein determining if the system access time is less than the first predetermined value comprises:

determining if the system access time is less than the first predetermined value; and if so, increasing the inactivity period of the respective device at a predetermined rate.

8. The method of claim 5, wherein determining if the system access time is greater than the second predetermined value comprises:

determining if the system access time is greater than a second predetermined value; and if so, decreasing the inactivity period of the respective device at a predetermined rate.

9. A computer-readable apparatus, comprising:

a computer-readable medium that stores an instruction sequence which when executed by a processor causes said processor to:

(a) separately determine a plurality of system access times of a respective plurality of circuits;

(b) for each circuit, determine if the respective system access time is less than a first predetermined value, if so, increasing an inactivity period of the respective circuit, said inactivity period indicating a time period during which the respective circuit is inactive before deactivating the respective circuit;

(c) for each circuit, determine if the respective system access time is greater than a second predetermined value, if so, decreasing the inactivity period of the respective circuit; and (d) for each circuit, determine if the system access time is within a range between the first and the second predetermined value, if so, preventing the inactivity period of the respective circuit from changing.

10. The computer-readable medium of claim 9, wherein (a) comprises:

(a.1) monitoring the respective circuit to determine the system access time of the respective circuit; and (a.2) providing the system access time of the respective circuit to the processor.

11. The computer-readable medium of claim 9, wherein (b) comprises:

(b.1) determining if the system access time is less than a first predetermined value; and (b.2) if so, increasing the inactivity period of the respective circuit at a predetermined rate.

12. The computer-readable medium of claim 9, wherein (c) comprises:

(c.1) determining if the system access time is greater than a second predetermined value; and (c.2) if so, decreasing the inactivity period of the respective circuit at a predetermined rate.

* * * * *

UNITED STATES PATENT AND TRADEMARK OFFICE
CERTIFICATE OF CORRECTION

PATENT NO.   : 6,347,377 B2
DATED        : February 12, 2002
INVENTOR(S)  : Barbee It is certified that error appears in the above-identified patent and that said Letters Patent is hereby corrected as shown below:

<u>Title page,</u>
Item [56], References Cited, "5,822,577" should read -- 5,822,597 --; and
FOREIGN PATENT DOCUMENTS, "EP 0 735 248 A2" should read
-- EP 0 735 457 A2 --.

Signed and Sealed this

First Day of April, 2003

JAMES E. ROGAN
*Director of the United States Patent and Trademark Office*